United States Patent [19]

Dearman

[11] 4,378,937
[45] Apr. 5, 1983

[54] PIPE ALIGNING TOOL

[76] Inventor: Timothy C. Dearman, P.O. Box 937, Pearland, Tex. 77581

[21] Appl. No.: 148,416

[22] Filed: May 9, 1980

Related U.S. Application Data

[63] Continuation-in-part of Ser. No. 83,175, Oct. 9, 1979, abandoned.

[51] Int. Cl.³ .............................................. B23K 37/04
[52] U.S. Cl. ........................................ 269/6; 269/43; 269/228; 269/209; 269/203; 269/258
[58] Field of Search .................. 269/6, 43, 45, 228, 269/203, 209, 258; 228/49 R; 81/420, 425 R; 29/270-272, 281.6

[56] References Cited

U.S. PATENT DOCUMENTS

| | | | |
|---|---|---|---|
| 1,323,127 | 11/1919 | Trevthardt | 269/45 |
| 2,105,954 | 1/1938 | Rippe | 269/43 |
| 2,108,077 | 2/1938 | Robinson | 269/43 |
| 2,374,899 | 5/1945 | Sasgen | 269/209 |
| 2,641,149 | 6/1953 | Petersen | 269/228 |
| 2,836,139 | 5/1958 | Holmberg | 269/45 |
| 3,290,971 | 12/1966 | Belval | 81/420 |
| 3,619,891 | 11/1971 | Harrison | 29/272 |
| 3,711,920 | 1/1973 | Simmons | 269/45 |
| 3,909,889 | 10/1975 | Emerson | 269/209 |
| 3,952,936 | 4/1976 | Dearman | 228/49 B |
| 4,195,828 | 4/1980 | Peterson | 269/43 |

*Primary Examiner*—Robert C. Watson
*Attorney, Agent, or Firm*—Learman & McCulloch

[57] ABSTRACT

A pipe welder's aligning tool for use in joining two pipe members end to end comprises a clamp having a pair of jaws movable toward and away from one another so as separably to clamp one pipe member adjacent its end. The jaws carry supports of such length as to extend beyond the one end of the clamped pipe to provide support for the confronting end of a second pipe member that is to be joined to the clamped pipe. To enable the supports to function properly regardless of the diameters of the pipes that are to be joined, the supports are adjustable relatively to their associated jaws. One of the jaws may be mounted on an elongate member which is adjustable to enable the tool to be used on pipes of greatly differing diameters.

20 Claims, 12 Drawing Figures

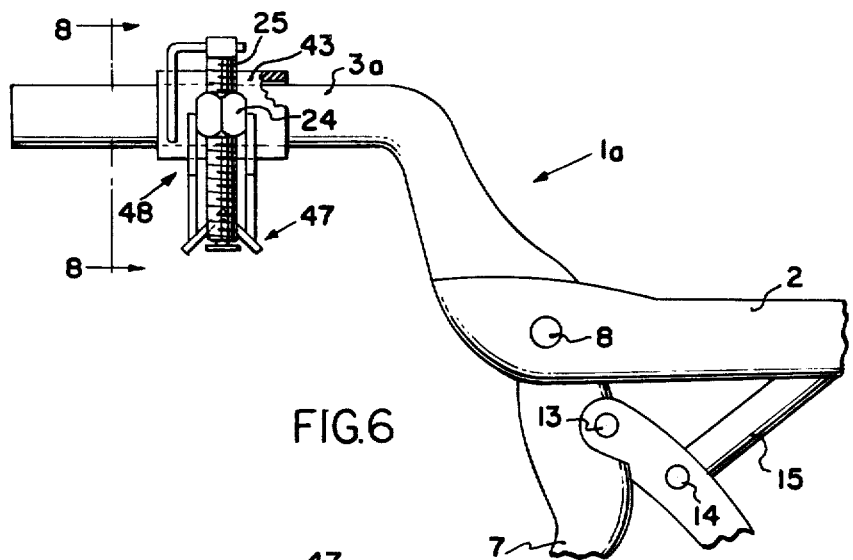
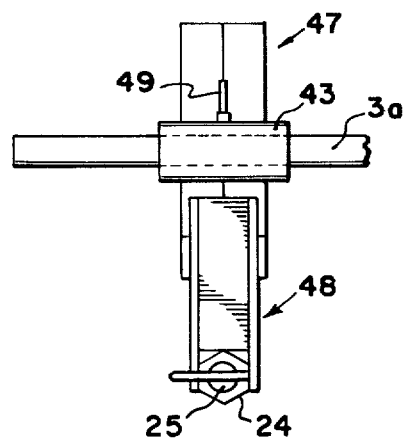
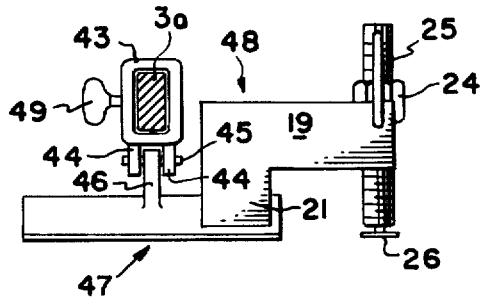
FIG.6
FIG.7     FIG.8
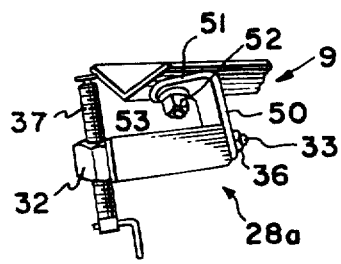
FIG.9

PIPE ALIGNING TOOL

RELATED APPLICATION

This application is a continuation in part of application Ser. No. 83,175, filed Oct. 9, 1979 now abandoned.

BACKGROUND OF THE INVENTION

In the welding of one pipe member to another it is conventional to apply to one of the pipe members adjacent one end thereof a clamp which carries a number of supports extending axially of the clamped pipe member and beyond the end of the latter so as to provide support for one end of a second pipe member that is to be joined to the clamped pipe member. Typical tools heretofore proposed for similar purposes are disclosed in Hickey U.S. Pat. No. 1,940,910; Robinson U.S. Pat. No. 2,108,077; Milton U.S. Pat. No. 2,127,828; Morris U.S. Pat. No. 2,674,966; Kinne U.S. Pat. No. 3,047,286; Phariss U.S. Pat. No. 3,414,950; Sehlman U.S. Pat. No. 3,422,519; Watson U.S. Pat. No. 3,467,295; Dearman U.S. Pat. No. 3,653,574; and Watson U.S. Pat. No. 3,666,159. Some of these tools are capable of use with pipes of different diameters, whereas others are not. Some of these tools are more quickly mounted on and removed from the pipes than are others, but each such tool requires more time than is desirable to mount it upon and remove it from the pipes.

SUMMARY OF THE INVENTION

A tool constructed according to the invention is capable of use with pipes of substantially different diameters and is rapidly and easily mounted on and removed from pipes. Such tool utilizes a hand-held, vise-like member having a pair of confronting jaws which may be moved toward and away from one another so as clampingly to engage, adjacent one end, any one of a number of different diameter pipes. The jaws carry support members which project from the jaws axially of the clamped pipe a distance sufficient to extend beyond the free end of the clamped pipe so as to enable each support member to engage and support that end of a second pipe member which is to be welded to the clamped pipe member.

In one embodiment the jaws are relatively movable about an axis so that one jaw moves toward and away from the other along an arcuate path, as a consequence of which the relative positions of the jaws will be different for different diameter pipes. To compensate for this, the support members carried by at least one of the jaws are themselves rotatable about axes parallel to the axis about which the jaws move, thereby enabling the support members to engage and provide support for the pipe member that is to be welded to the clamped pipe member and in such manner as to ensure proper alignment of the pipe members and secure support of the pipe member that is to be welded to the clamped member.

In another embodiment the jaws are movable toward and away from one another, as set forth above. In addition, one of the jaws is adjustable and rockable relatively to the vise-like member to enable the tool to accommodate pipes of greatly differing size.

DESCRIPTION OF THE DRAWINGS

A tool constructed in accordance with the invention is disclosed in the following description and in the accompanying drawings, wherein:

FIG. 6 is a fragmentary view similar to FIG. 1 but illustrating a modification;

FIG. 7 is a top plan view of the structure shown in FIG. 6;

FIG. 8 is a sectional view taken on the line 8—8 of FIG. 6;

FIG. 9 is an isometric view of a further modification;

DETAILED DESCRIPTION

Figure 1:
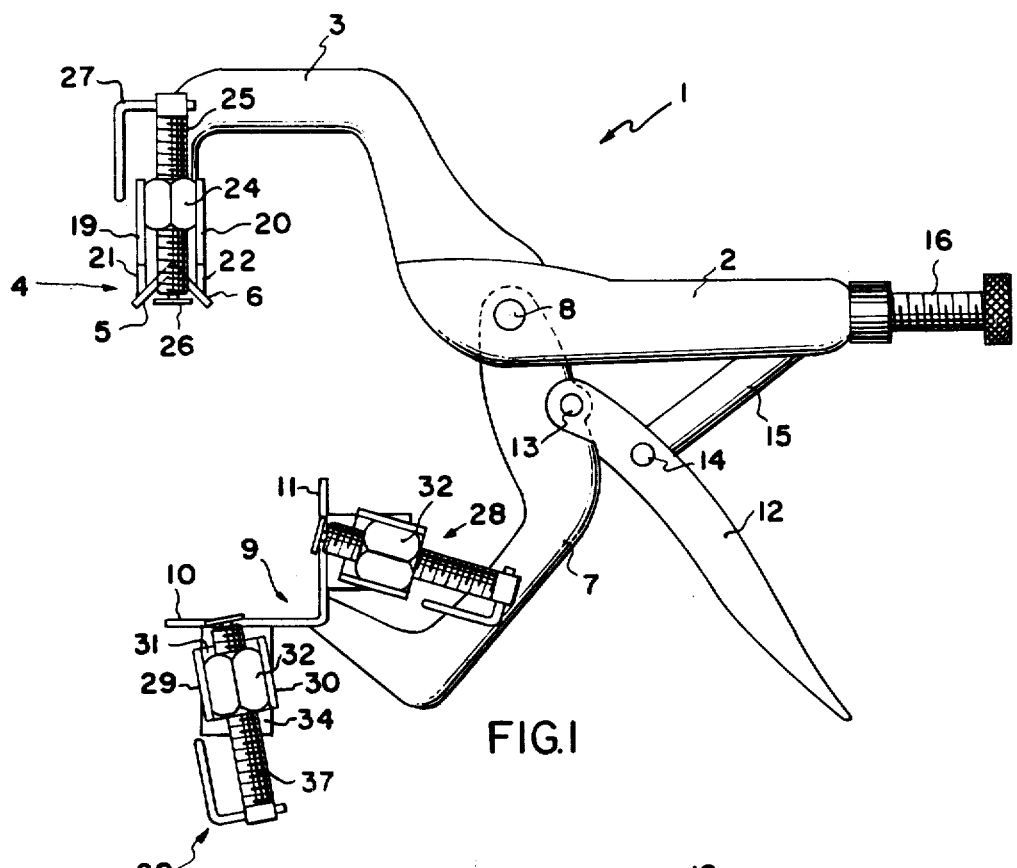
FIG. 1 is a side elevational view of one embodiment of a tool with its jaws open.
Figure 4:
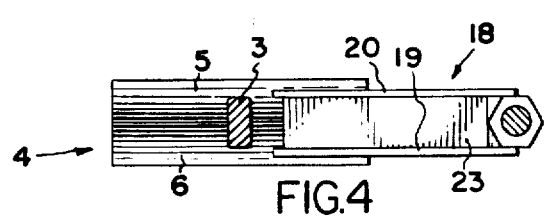
FIGS. 4 and 5 are sectional views taken on the lines 4—4 and 5—5, respectively, of FIG. 3.
Figure 5:
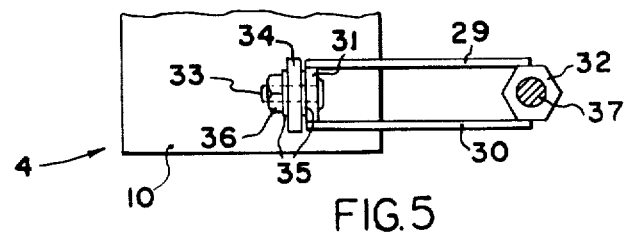

A tool constructed in accordance with one preferred embodiment of the invention is designated generally by the reference character 1 and comprises a handle 2 joined at one end to a generally U-shaped arm 3 at the free end of which is secured a clamping jaw 4 having two right angular limbs 5 and 6 forming a downwardly diverging open side or trough. A second arm 7 is pivoted as at 8 to the handle 2 and is joined at its free end to a second clamping jaw 9 having a pair of right angular limbs 10 and 11 forming an upwardly diverging, open side or trough. An operating lever 12 is pivoted to the arm 7 as at 13 and also is pivoted as at 14 to one end of a link 15, the opposite end of which is slidably accommodated within the handle 2 and abuts an adjusting screw 16. Further details as to the construction and operation of the parts of the tool 1 can be obtained from U.S. Pat. No. 2,641,149.

Counterclockwise movement of the lever 12 from the position shown in FIG. 1 effects relative movement of the clamping jaws 4 and 9 toward one another about the axis of the pivot 8. In the disclosed embodiment, the jaw 9 is movable toward the jaw 4 along an arcuate path. Movement of the lever 12 clockwise from the position shown in FIG. 2 causes relative movement of the jaws 4 and 9 away from one another.

Figure 2:
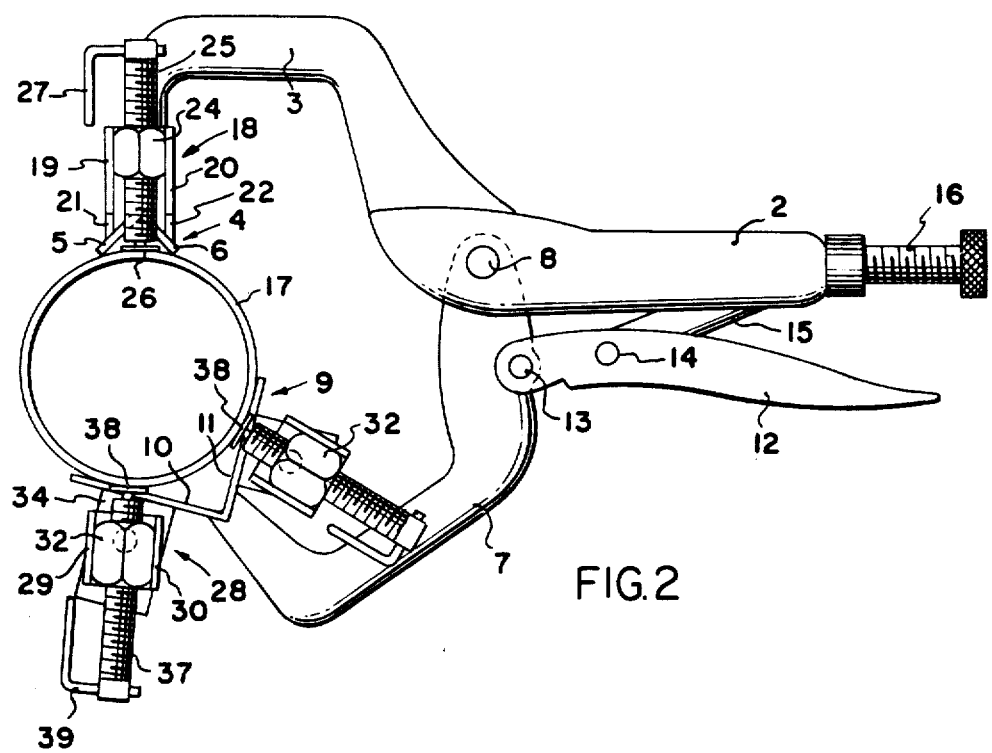
FIG. 2 is a view similar to FIG. 1, but illustrating the tool with its jaws in pipe clamping engagement.
Figure 3:
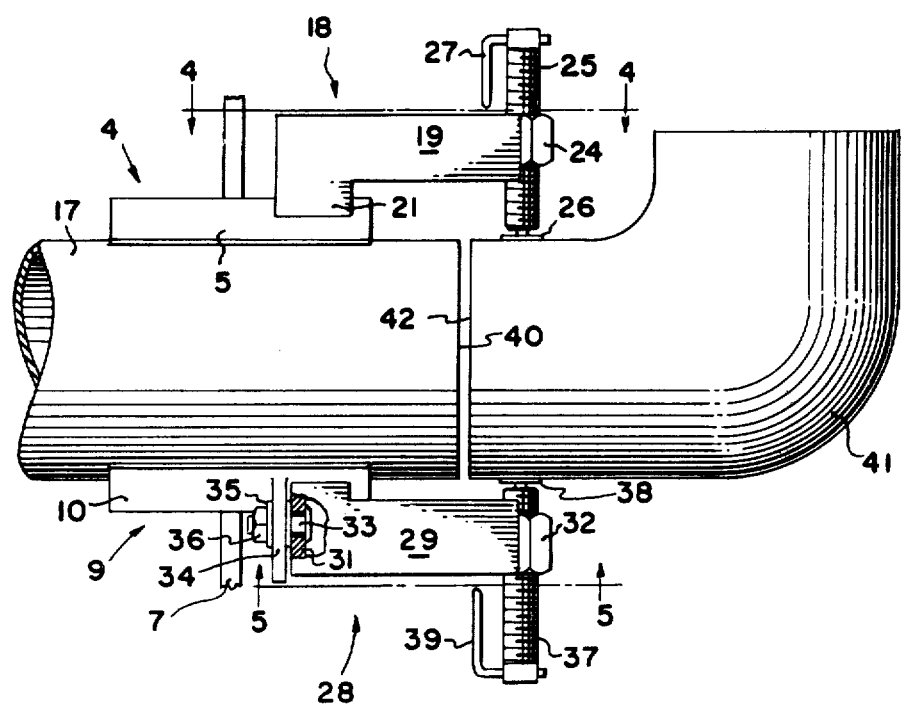
FIG. 3 is a fragmentary front elevational view of the tool in the condition illustrated in FIG. 2, and also showing a pipe fitting held in position to be joined to the pipe member clamped by the tool.

The jaws 4 and 9 are adapted to seat upon and clampingly engage a first pipe member 17 adjacent one end of the latter, as is shown in FIGS. 2 and 3. The limbs 10 and 11 of the jaw 9 are longer than the corresponding limbs of the clamp jaw 4, thereby enabling the jaw 9 to accommodate pipes of greatly differing diameters. For example, any pipe between one-half inch and three inches in diameter may be clamped between the jaws 4 and 9.

A support member 18 is fixed to the jaw 4 and comprises a pair of spaced, parallel bars 19 and 20 having legs 21 and 22, respectively, that are welded to the limbs 5 and 6. Welded between the bars 19 and 20 is a reinforcing plate 23. Also welded to the bars 19 and 20, and to the plate 23, is an interiorly threaded anchor nut 24 in which is rotatably accommodated a correspondingly threaded adjustable bearing screw 25 having at one end a swivelable pad or foot 26 and at the other end a pivoted crank 27. As is best shown in FIG. 1 the bars 19 and 20 straddle the jaw 4.

The jaw 9 carries a pair of support members 28, each of which is identical, one being mounted on the jaw limb 10 and the other being mounted on the jaw limb 11. The three support members 18 and 28 thus are spaced circumferentially along an arc.

Each support member 28 comprises a pair of parallel bars 29 and 30 that are welded at corresponding ends to a cross bar 31. At their opposite ends the bars 29 and 30 are welded to an internally threaded anchor nut 32. Fixed to the cross bar 31 is one end of a threaded stud 33. The stud 33 extends through an opening formed in a pedestal or bracket 34 which is welded to the jaw limb 10, the stud forming an axis of rotation of the support 28 substantially parallel to the axis of movement of the jaws 4 and 9. The stud 33 carries washers 35 and a nut 36 for a purpose presently to be explained.

The anchor nut 32 receives a rotatable, correspondingly threaded bearing screw 37, similar to the screw 25, and which also carries at one end a swivelable foot or pad 38 and at its other end a pivoted crank arm 39. To condition the tool 1 for operation, the jaws 4 and 9 are adjusted to spaced apart positions, as shown in FIG. 1, so as to accommodate therebetween a pipe 17. By manipulation of the adjusting screw 16 and movement of the lever 12 from the position shown in FIG. 1 to the position shown in FIG. 2 the jaws 4 and 9 may be clamped firmly on the pipe 17. As is indicated in FIG. 3, the jaws 4 and 9 are clamped on the pipe 17 adjacent one end 40 thereof and in such position that the supports 18 and 28 project beyond the pipe end 40.

Following clamping of the tool 1 to the pipe 17 a pipe member 41, such as an elbow, may be moved into a position in which one end 42 thereof is adjacent and confronts the end 40 of the pipe 17. The bearing screws 25 and 37 then may be rotated so as to cause them to move toward the pipe member 41 and bear against the latter, the pads 26 and 38, if used, preventing marring of the surface of the pipe member 41.

During movement of the bearing screws into bearing relation with the pipe member 41, the supports 28 may be rocked about the axes of the respective studs 33 and fixed in such positions, by means of the nuts 36, that the longitudinal axes of the bearing screws 37 intersect at or closely adjacent the longitudinal axis of the end portion of the pipe member 41. The pipe member 41 thus will be supported at three points about its periphery so as to ensure stable support thereof. The bearing members 25 and 37 may be adjusted inwardly and outwardly so as to enable the pipe member 41 to be supported in a position in which the longitudinal axis of the gripped end portion coincides with the longitudinal axis of the pipe 17 and with the ends 40 and 42 of the pipe members suitably spaced from one another.

Following the positioning of the pipe member 41 relative to the pipe 17, the two pipe members may be welded at the juncture therebetween so as to join the two pipe members to one another. As is best shown in FIG. 3, the supports 18 and 28 are radially spaced from the peripheries of the pipe members 17 and 41, thereby providing ample space to enable the entire circumference of the two pipe members to be welded without removal of the tool 1 from the pipes.

The tool is capable of being used with pipes of greatly differing diameters. For example, the jaws 4 and 9 can be used, by suitable adjustment of the adjusting screw 16, to enable them to be clamped onto pipes having diameters varying from one-half inch to three inches. In the modification shown in FIGS. 6 and 7, however, it is possible to utilize a single tool on pipes whose diameters vary from one-half inch to four inches.

The tool 1a illustrated in FIG. 6 corresponds substantially to the tool 1, but differs from the latter in that the tool 1a includes an arm 3a which is straight and terminates in a free end. Slidably accommodated on the arm 3a is a carrier 43 to which is secured one end of a pair of support arms 44, the opposite ends of which are pivoted as at 45 to a pedestal 46 fixed to a V-shaped jaw 47 like the jaw 4. Also fixed to the jaw 47 is a support member 48 similar in all respects to the support 18. The pivotal connection of the carrier 43 to the jaw 47 enables the latter to be seated properly on a pipe regardless of the position of the carrier on the arm 3a.

In the embodiment of FIGS. 6-8 the carrier 43 may be slid along the arm 3a to any selected position and be maintained in such position by means of a set screw 49. The ability of the jaw 47 to be shifted longitudinally of the arm 3a enables the jaw to be clamped against the upper surface of pipes of greatly differing diameters, thereby substantially increasing the range of pipes with which the tool 1a may be used.

FIG. 9 discloses a further modification which may be used in either of the previously disclosed embodiments. In the embodiment of FIG. 9, the support member 28a corresponds exactly to the supports 28 previously described. In this case, however, the mounting pedestal 34 is replaced by an L-shaped pedestal 50 having a foot 51 provided with an opening for the accommodation of a threaded stud 52 which is fixed to the jaw 9. A nut 53 retains the pedestal 50 on the stud 52. In this embodiment the support 28a not only is rotatable about its own longitudinal axis, as described earlier, but also is rotatable about the axis of the stud 52, which axis is perpendicular to the axis of movement of the jaws. This arrangement ensures the ability of each of the bearing screws 37 to be adjusted to a position in which its longitudinal axis extends along a line which substantially intersects the longitudinal axis of the pipe on which the jaw 9 is clamped.

Figure 10:
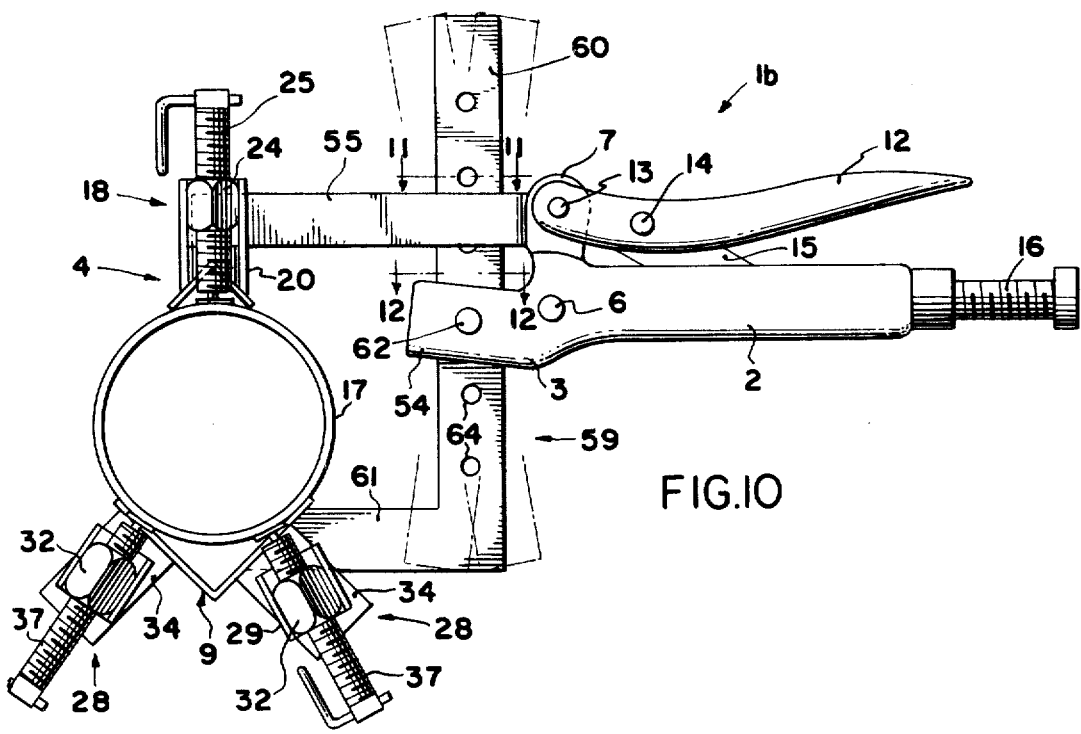
FIG. 10 is a view similar to FIG. 1, but illustrating a further modification.
Figure 11:
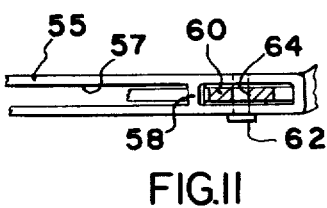
FIGS. 11 and 12 are sectional views on taken on the lines 11—11 and 12—12, respectively, of FIG. 10.
Figure 12:
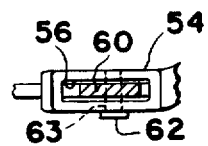

The tool 1b illustrated in FIGS. 10-12 has its arms 3 and 7 shortened and joined to retaining members 54 and 55, respectively. The retainer 54 has a longitudinally extending slot 56 and the retainer 55 has a longitudinally extending slot 57 spanned by a transverse reinforcement 58. An L-shaped support 59 has an elongate leg 60 extending slidably through each of the retainers 54 and 55 and a shorter, right angle leg 61 that is fixed at its free end to the clamp jaw 9. The free end of the retainer 55 is secured to the clamp jaw 4. The jaw 4 is equipped with a support 18 and the jaw 9 is equipped with supports 28 or 28a like those described earlier.

The support leg 60 is vertically and linearly adjustable relative to the retainers 54 and 55 and may be maintained in a selected one of a number of adjusted positions by means of a pin 62 removably accommodated in an opening 63 formed in the retainer 54 and in a selected one of a number of openings 64 formed in the leg 60.

The length of the slots 56 and 57 is greater than the width of the support leg 60. As a consequence, the support 59 is capable of rotary movement about the axis of the pin 62. The reinforcement 58 and the closed end of the slot 57 limit rocking movement of the support 59.

The adjustability of the support 59 longitudinally of the arm 60 enables the jaws 4 and 9 to be moved toward and away from one another to accommodate therebetween pipes of greatly differing diameter. The ability of the support 59 to rock about the axis of the pin 63 enables the jaw 9 to be located beneath the pipe it supports and in a position substantially diametrally opposed to the jaw 4.

The disclosed embodiments are representative of presently preferred forms of the invention, but are intended to be illustrative rather than definitive thereof. The invention is defined in the claims.

I claim:

1. A clamp for use in welding first and second pipe members to one another in end to end relation, said clamp comprising first and second clamp jaws; means mounting said jaws for relative movement toward and away from one another into and out of clamping engagement with one of said pipe members and adjacent one end thereof; a plurality of elongate supports carried by said jaws and extending therefrom a distance to project beyond said one end of said one pipe member when said jaws are in clamping engagement with said one pipe member and support said second pipe member in end to end confrontation with said one pipe member; and means mounting a selected number of said supports on said jaws for rotation relative thereto about substantially parallel axes.

2. A clamp according to claim 1 wherein each of said supports includes a bearing member adapted to bear upon said second pipe member.

3. A clamp according to claim 2 including means mounting each of said bearing members for adjustment relative to the associated support in directions toward and away from said second pipe member.

4. A clamp according to claim 1 wherein one of said jaws is larger than the other.

5. A clamp according to claim 1 wherein one of said jaws has an arcuate path of movement toward and away from the other of said jaws.

6. A clamp according to claim 5 wherein said selected number of supports are mounted on said one of said jaws.

7. A clamp according to claim 1 wherein one of said jaws has a linear path of movement toward and away from the other of said jaws.

8. A clamp according to claim 1 wherein each of said supports mounted on one of said jaws is rotatable and each of said supports mounted on the other of said jaws is nonrotatable.

9. A clamp according to claim 1 wherein each of said jaws has limbs forming a vee having an open side, the open sides of the vees confronting one another.

10. A clamp according to claim 9 wherein the limbs of one of said jaws are longer than the limbs of the other of said jaws.

11. A clamp according to claim 1 wherein said selected number of said supports are rotatable about further axes.

12. A clamp according to claim 1 wherein the mounting means for one of said jaws mounts the latter for movements linearly and arcuately relative to the other of said jaws.

13. A clamp according to claim 12 including means for fixing said one of said jaws in a selected position of linear adjustment relative to said other of said jaws.

14. A clamp for use in welding first and second pipe members to one another in end to end relation, said clamp comprising a handle; a pair of arms joined to said handle for relative movement about an axis; a first clamp jaw; means mounting said first jaw on one of said arms; a second clamp jaw; means mounting said second jaw on the other of said arms, said jaws being relatively movable toward and away from one another in response to relative movement of said arms about said axis so as to move into and out of clamping engagement with one of said pipe members and adjacent one end of the latter; at least one support member carried by said first jaw and extending beyond the latter in a direction to project beyond said one end of said one pipe member; at least a pair of support members carried by said second jaw and extending beyond the latter in a direction to project beyond said one end of said one pipe member; said one and said pair of support members being spaced from one another along an arc; and a bearing member carried by each of said support members and extending radially of said arc to provide support for said second pipe member with one end of the latter confronting said one end of said first pipe member.

15. A clamp according to claim 14 wherein each of said bearing members is adjustable radially of said arc.

16. A clamp according to claim 14 wherein selected ones of said support members are rotatable about axes substantially parallel to the axis of movement of said arms.

17. A clamp according to claim 14 wherein selected ones of said support members are rotatable about axes substantially perpendicular to the axis of movement of said arms.

18. A clamp according to claim 14 wherein at least one of said jaws is adjustable along its associated arm in directions substantially radially of the axis of movement of said arms.

19. A clamp according to claim 14 wherein the means for mounting one of said jaws on the corresponding arm is pivotal.

20. A clamp for use in welding first and second pipe members to one another in end to end relation, said clamp comprising a first clamp jaw; a second clamp jaw; means mounting said jaws for relative movement about an axis toward and away from one another into and out of clamping engagement with one of said pipe members adjacent one end of the latter; means for adjusting one of said clamp jaws linearly toward and away from the other of said clamp jaws, said one of said clamp jaws being rotatable relative to the other of said clamp jaws; at least one support member carried by said first jaw and extending beyond the latter in a direction to project beyond said one end of said one pipe member; at least a pair of support members carried by said second jaw and extending beyond the latter in a direction to project beyond said one end of said one pipe member, said one and said pair of support members being spaced from one another along an arc; and a bearing member carried by each of said support members and extending radially of said arc to provide support for said second pipe member with one end of the latter confronting said one end of said first pipe member.

* * * * *